United States Patent
Qin et al.

(10) Patent No.: US 12,446,980 B2
(45) Date of Patent: Oct. 21, 2025

(54) SURGICAL ROBOT NAVIGATION AND POSITIONING SYSTEM AND MEASUREMENT VIEWING ANGLE MULTI-OBJECTIVE OPTIMIZATION METHOD

(71) Applicants: NANKAI UNIVERSITY, Tianjin (CN); SHENZHEN RESEARCH INSTITUTE OF NANKAI UNIVERSITY, Guangdong (CN)

(72) Inventors: Yanding Qin, Tianjin (CN); Jianda Han, Tianjin (CN); Hongpeng Wang, Tianjin (CN); Yugen You, Tianjin (CN); Zhichao Song, Tianjin (CN); Yiyang Meng, Tianjin (CN)

(73) Assignees: NANKAI UNIVERSITY; SHENZHEN RESEARCH INSTITUTE OF NANKAI UNIVERSITY

( * ) Notice: Subject to any disclaimer, the term of this patent is extended or adjusted under 35 U.S.C. 154(b) by 143 days.

(21) Appl. No.: 18/268,315

(22) PCT Filed: May 24, 2022

(86) PCT No.: PCT/CN2022/094673
§ 371 (c)(1),
(2) Date: Jun. 20, 2023

(87) PCT Pub. No.: WO2023/279874
PCT Pub. Date: Jan. 12, 2023

(65) Prior Publication Data
US 2024/0130806 A1  Apr. 25, 2024

(30) Foreign Application Priority Data
Jul. 7, 2021 (CN) .......................... 202110764799.1

(51) Int. Cl.
A61B 34/20 (2016.01)
A61B 34/30 (2016.01)
(Continued)

(52) U.S. Cl.
CPC .............. *A61B 34/30* (2016.02); *A61B 90/96* (2016.02); *G16H 40/63* (2018.01);
(Continued)

(58) Field of Classification Search
CPC ......... A61B 34/20; A61B 34/30; A61B 34/70; A61B 2034/107; A61B 2034/2055;
(Continued)

(56) References Cited

FOREIGN PATENT DOCUMENTS

CN  104739514 A  *  7/2015  ............. A61B 5/061

* cited by examiner

*Primary Examiner* — Boniface N Nganga

(57) ABSTRACT

A surgical robot navigation and positioning system, and a measurement viewing angle multi-objective optimization method includes a surgical operation planning system, a control host for data processing and robot control, a series robot having any degree of freedom, a positioning sensor and its adaptive positioning tools (4), and an environmental perception sensor. The measurement viewing angle multi-objective optimization method comprises: obtaining information on and positions of all positioning tools (4) of each link in a surgery process, and establishing a multi-objective minimization problem based on a decision variable; establishing a three-dimensional Cartesian coordinate system for each positioning tool (4); defining a non-interference margin function between the positioning tools (4), and at least two objective functions of minimization optimization; and setting constraint conditions to minimize the at least two objective functions at the same time.

4 Claims, 3 Drawing Sheets

(51) Int. Cl.
*A61B 90/96* (2016.01)
*G16H 40/63* (2018.01)
*A61B 34/10* (2016.01)
*A61B 90/00* (2016.01)

(52) U.S. Cl.
CPC . *A61B 2034/107* (2016.02); *A61B 2034/2057* (2016.02); *A61B 2034/2065* (2016.02); *A61B 2090/3945* (2016.02)

(58) Field of Classification Search
CPC .... A61B 2034/2057; A61B 2034/2065; A61B 2034/2067; A61B 2034/2072; A61B 90/69; A61B 90/361; G16H 20/40; G16H 40/63
See application file for complete search history.

SURGICAL ROBOT NAVIGATION AND POSITIONING SYSTEM AND MEASUREMENT VIEWING ANGLE MULTI-OBJECTIVE OPTIMIZATION METHOD

TECHNICAL FIELD

The present disclosure relates to the technical field of medical equipment, in particular to the field of surgical robots, and in particular to a surgical robot navigation and positioning system and a measurement viewing angle multi-objective optimization method.

BACKGROUND

A mobile surgical robot provides a brand-new choice for all kinds of surgical operations because of its advantages of accuracy and safety. After a period of development, the related technology of a surgical robot is becoming more and more mature, and its frequency of use in clinical surgery is also increasing year by year.

The surgical robot with an optical navigation system is widely used in robot-assisted surgery. With the help of image navigation technology, the robot-assisted surgery system can accurately position the surgical site and operating tools to assist doctors in carrying out minimally invasive surgery, remote surgery or robot-assisted surgery. At present, surgical navigation relies on an optical navigation device to position the surgical site or the surgical tool by observing and identifying the optical positioning tool and calculating the image and the position.

In the practical operation of the prior art, the surgical navigation device is manually adjusted by the doctor who assists the surgery according to the surgical needs. Specifically, by dragging the handle of the device, the optical navigation device is adjusted to the appropriate observation position. However, this interactive method brings a lot of inconvenience in the practical surgical process. For some special surgical position designs, it is difficult to adjust the appropriate measurement position by hand alone, and the position accuracy cannot be guaranteed.

Therefore, it has become anew trend to give motion capability to the optical navigation device. It is necessary to realize the active navigation of optical navigation, which requires the robot not only to have optical navigation sensors for positioning, but also to have sensors with other environmental sensing functions to sense the occurrence of position changes of people or devices in the operating room, thus triggering the active movement in response. Therefore, a special hardware component system is required. At the same time, how to implement the measurement viewing angle multi-objective optimization in the above system is also a problem that needs to be considered.

Considering the above factors, the present disclosure provides a surgical robot navigation and positioning system and a measurement viewing angle multi-objective optimization method, which can better solve the measurement viewing angle multi-objective optimization problem of the surgical robot navigation and positioning system.

SUMMARY

In order to solve the above problems, the present disclosure provides a surgical robot navigation and positioning system and a measurement viewing angle multi-objective optimization method.

A surgical robot navigation and positioning system is provided, wherein the system comprises a surgical operation planning system, a control host for data processing and robot control, a serial robot having any degree of freedom, a positioning sensor and adaptive positioning tools, and an environmental perception sensor; the positioning sensor and/or the environment perception sensor are connected to the flange of the robot.

The positioning sensor is an optical positioning sensor and comprises a binocular depth camera based on visible light and/or a binocular positioning camera based on near-infrared light.

The environment perception sensor comprises a binocular depth camera based on visible light, a laser radar and an ultrasonic sensor.

The environment perception sensor and the positioning sensor are two different types of sensors arranged in combination or are implemented by the same sensor which is used for environmental perception and positioning at the same time.

There is an overlapping area between spatial areas measured by the environmental perception sensor and the positioning sensor, and the overlapping area is a measurable area of the surgical robot navigation and positioning system.

There is one or more positioning tools; each positioning tool is provided with K positioning parts which are distributed and formed according to a certain positional relationship; according to the different positions and/or numbers of K positioning parts on each positioning tool, the positioning tool is uniquely determined; the positioning part is a specific marker capable of reflecting light or emitting light, and/or a part formed by arranging a plurality of specific patterns according to a certain positional relationship.

The specific marker capable of reflecting light at least comprises: balls with high reflectivity coating on the surfaces; the specific marker capable of emitting light at least comprises: an LED lamp.

The specific pattern is a pattern specially coded and designed, and at least comprises a QR Code and a Gray Code.

A measurement viewing angle multi-objective optimization method for the surgical robot navigation and positioning system as described above is provided, wherein the method obtains the number, the serial number and the position of required positioning tools of each link in a surgical process through a surgical operation planning system, and establishes a multi-objective minimization problem based on a decision variable x:

$$x=[q_1, q_2, q_3, \ldots, q_N]  \quad \text{(Formula 1)}$$

where $q_1, q_2, q_3, \ldots, q_N$ are joint variables; N is the number of the joint variables; the decision variable x denotes a vector consisted of N joint variables of a robot, and the value range is the joint value range Q achievable by each joint of the robot, that is, $x \in Q$.

Preferably, the method comprises the following steps:
Step 1, establishing a three-dimensional Cartesian coordinate system for each positioning tool;
Step 2, defining at least two objective functions $f_1$ and $f_2$ of minimization optimization;
Step 3, setting constraint conditions to minimize the at least two objective functions $f_1$ and $f_2$ at the same time.

Preferably, Step 1 comprises the following steps:
Step 1.1, designing the center of each positioning tool with a specific shape feature, and taking the intersection point between a feature axis and a plane where a centroid of a positioning part is located as a coordinate origin; the shape feature is at least a round hole, a hemisphere, a boss and a cone; taking the coordinate origin as the center of the sphere, and constructing a minimum circumscribed ball enveloping K positioning parts on the positioning tool for each positioning tool, wherein the radius of the minimum circumscribed ball is $l_i$; in practical application, a certain margin will be added on the basis of $l_i$, that is, the spherical surface size is set slightly larger than $l_i$ during estimation, for example, $l_i$ is multiplied by a margin coefficient ω to obtain $r_i$, and ω>1, so as to prevent some small errors in practical operation from leading to the failure of the method;

Step 1.2, taking the normal direction of the plane where the centroids of K positioning parts are located as the z axis direction, wherein the direction towards the side where the K positioning parts are attached is the positive direction of the z axis; establishing a three-dimensional Cartesian coordinate system by taking the direction perpendicular to the z axis and pointing to the positioning part farthest from the coordinate origin as the positive direction of the x axis;

Step 1.3, denoting the set of all positioning tools as S, in which the center of the coordinate system of the i-th positioning tool is $M_i$, that is, $M_i \in S$.

Preferably, at least two objective functions $f_1$ and $f_2$ of minimization optimization in Step 2 are defined as follows:

$$f_1 = \max_m \|\overrightarrow{NM_m}\| \quad \text{(Formula 2)}$$

$$f_2 = \min_{j,k \in S} -O_{min}(j,k) \quad \text{(Formula 3)}$$

where $\|\overrightarrow{NM_m}\|$ denotes the distance between the coordinate origin of the m-th positioning tool and the coordinate origin of the positioning sensor; $f_1$ denotes the maximum distance between the coordinate origin of all positioning tools and the coordinate origin of the positioning sensor; $O_{min}(j, k)$ denotes the smaller non-interference margin function in the camera coordinates of the positioning sensor for a given pair of positioning tools j and k; $\min_{j,k \in S} O_{min}(j, k)$ denotes the minimum non-interference margin function value among the binary combinations of all the positioning tools measured in all the cameras of the positioning sensor under the pose of the robot determined by q;

calculating the smaller non-interference margin function $O_{min}(j, k)$ by the following formula:

$$\alpha_{G,j,k} = \cos^{-1}\left(\frac{\overrightarrow{GM_j} \cdot \overrightarrow{GM_k}}{\|\overrightarrow{GM_j}\|\|\overrightarrow{GM_k}\|}\right) \quad \text{(Formula 4)}$$

$$\beta_{G,j} = \sin^{-1}\left(\frac{r_j}{\|\overrightarrow{GM_j}\|}\right) \quad \text{(Formula 5)}$$

$$r_j = \omega l_j \text{ and } \omega > 1 \quad \text{(Formula 6)}$$

$$\beta_{G,k} = \sin^{-1}\left(\frac{r_k}{\|\overrightarrow{GM_k}\|}\right) \quad \text{(Formula 7)}$$

$$r_k = \omega l_k, \text{ and } \omega > 1 \quad \text{(Formula 8)}$$

$$O(j, k, G) = \min_{G=R,L}(\alpha_{G,j,k} - \beta_{G,j} - \beta_{G,k}) \quad \text{(Formula 9)}$$

$$O(j, k, L) = \min_L(\alpha_{L,j,k} - \beta_{L,j} - \beta_{L,k}) \quad \text{(Formula 10)}$$

$$O(j, k, R) = \min_R(\alpha_{R,j,k} - \beta_{R,j} - \beta_{R,k}) \quad \text{(Formula 11)}$$

$$O_{min}(j, k) = \min(O(j, k, L), O(j, k, R)) \quad \text{(formula 12)}$$

where G is the coordinate origin of the left or right camera in the positioning sensor; L and R are the coordinate origins of the left and right cameras in the positioning sensor, respectively; $M_j$ and $M_k$ are the centers of the minimum circumscribed ball whose radii are $l_j$ and $l_k$ for any two positioning tools j and k, respectively, that is, the coordinate origin of the positioning tools j and k; $r_j$ and $r_k$ are the extension radii of the positioning tools j and k, respectively; the margin coefficient ω is a constant greater than 1; the vector lengths $\|\overrightarrow{GM_j}\|$ and $\|\overrightarrow{GM_k}\|$ are measured by the positioning sensor; "·" denotes vector point multiplication.

Preferably, the constraint conditions in Step 3 are as follows:

constraint condition 1: $\forall i \in S, M_i \in A(x)$ constraint condition 2: $\forall i \in S, \max_{G \in \{R,L\}} \alpha_{G,i} \leq Th$ constraint condition 3: $\forall j, k \in S, \min_{G \in \{R,L\}} O(j, k, G) \geq 0$, where constraint condition 1 indicates that any positioning tool should be in the observable range of both the positioning sensor and an environmental perception sensor;

constraint condition 2 indicates that the included angle between the connecting line from the camera on either side of the positioning sensor to any positioning tool and the z-axis direction of the positioning tool is not greater than the established threshold; $\alpha_{G,i}$ denotes the included angle between the vector from the coordinate origin of the i-th positioning tool to the coordinate origin of the left or right camera in the positioning sensor and the vector in the z-axis direction of the i-th positioning tool; and Th is a preset threshold;

constraint condition 3 indicates that any two positioning tools are not interfere from each other, that is, the minimum value of the non-interference margin function O(j, k, G) between any two positioning tools is non-negative.

The technical scheme of the present disclosure has the following beneficial effects.

The present disclosure provides a surgical robot navigation and positioning system and a measurement viewing angle multi-objective optimization method. First, the present disclosure optimizes the surgical robot navigation and positioning system. Second, in view of the fact that there is an overlapping area (the overlapping area is the measurable area of the system) between spatial areas measured by the environmental perception sensor and the positioning sensor in the surgical robot navigation and positioning system, the present disclosure defines the non-interference margin function between the positioning tools, and solves the optimization problem by constraining the multi-objective optimization algorithm, and thus the measurement viewing angle multi-objective optimization problem in the surgical robot navigation and positioning system is better solved.

DETAILED DESCRIPTION

The technical scheme in the embodiment of the present disclosure will be clearly and completely described hereinafter with reference to the attached drawings. It can be understood that the described embodiment is only a part of the embodiment of the present disclosure, rather than all of the embodiments. Based on the embodiments in the present disclosure, all other embodiments obtained by those skilled in the art without creative work belong to the scope of protection of the present disclosure.

The present disclosure provides a surgical robot navigation and positioning system and a measurement viewing angle multi-objective optimization method.

Figure 1:
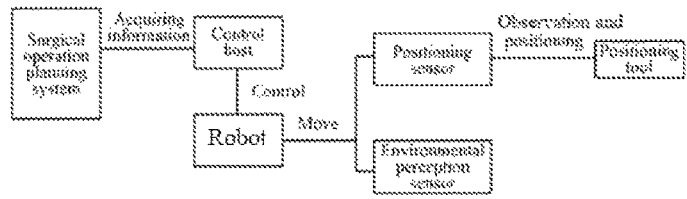
FIG. 1 is an overall structural diagram of a surgical robot navigation and positioning system according to an embodiment of the present disclosure.

FIG. 1 is an overall structural diagram of a surgical robot navigation and positioning system according to the present disclosure. As shown in FIG. 1, the surgical robot navigation and positioning system comprises a surgical operation planning system, a control host for data processing and robot control, a robot, a positioning sensor and adaptive positioning tools, and an environmental perception sensor; the environment perception sensor realizes the sensing of the surgical environment, such as potential obstructions and/or obstacles. The robot is a serial robot with 7 degrees of freedom; the positioning sensor and/or the environment perception sensor are connected to the flange of the robot.

Figure 2:
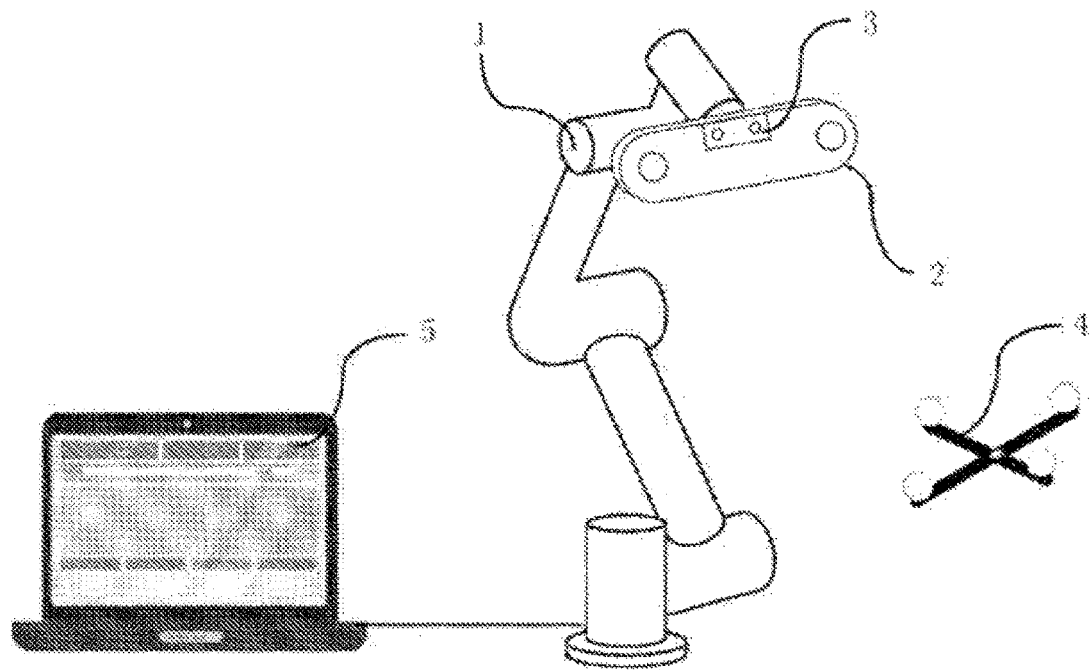
FIG. 2 is an implementation diagram of a surgical robot navigation and positioning system according to an embodiment of the present disclosure.

FIG. 2 is an embodiment diagram of a surgical robot navigation and positioning system according to the present disclosure. As shown in FIG. 2, the implementation is as follows. The system consists of a robot with 7 degrees of freedom, a near-infrared optical positioning system (that is, "positioning sensor") and a binocular camera connected to the flange of the robot, a computer for data processing and robot control, and a positioning tool adapted to the near-infrared optical positioning system.

The near-infrared optical positioning system here includes two infrared emitting lamps and an infrared camera for detecting reflected infrared light. The working principle is that the left and right infrared emitting lamps emit specific infrared light and project the specific infrared light on the surface of a reflective ball on the positioning tool. The reflective ball reflects infrared light, which is observed by the infrared camera. According to the received reflected infrared light, the relative position between the near-infrared optical positioning system and each ball is calculated, and the relative position of each positioning tool with respect to the near-infrared optical positioning system is calculated according to the pre-calibrated positioning relationship model.

The base coordinate system of the robot is {O}, the joint angle of the kth joint is $q_k$, and the origin of the coordinate system of the flange is {E}. The center coordinate of the near-infrared optical positioning system is N, and the coordinates of the left and right cameras are R and L, respectively. When the robot is in position p, the measurable area space where the near-infrared optical positioning system and the environmental perception sensor overlap is A(p). The coordinate system of the binocular camera is {C}.

As shown in FIG. 2, the reference numerals have the following meanings: 1. Robot with 7 degrees of freedom, 2. Near-infrared optical positioning system, 3. Binocular camera, 4. Positioning tool, and 5. Computer.

Figure 3:
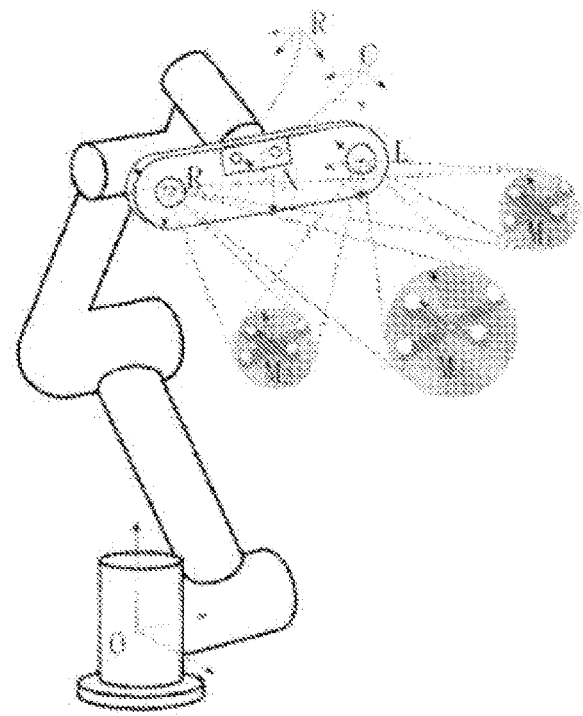
FIG. 3 is a schematic diagram of establishing a coordinate system in a surgical robot navigation and positioning system according to the embodiment of the present disclosure.

FIG. 3 is a schematic diagram of establishing a coordinate system in a surgical robot navigation and positioning system according to the present disclosure. The set of all positioning tools is S. The center of the coordinate system of the i-th positioning tool is $M_i$, that is, $M_i \in S$. The center coordinate of the optical positioning system is N, and the coordinates of the left and right cameras are R and L, respectively. When the robot is in position p, the measurable area space of the optical positioning system is A(p), that is, the set of all possible positions where the positioning tool can be measured normally when the robot is in position p without interference. The coordinate system of the binocular camera is {C}.

Figure 4:
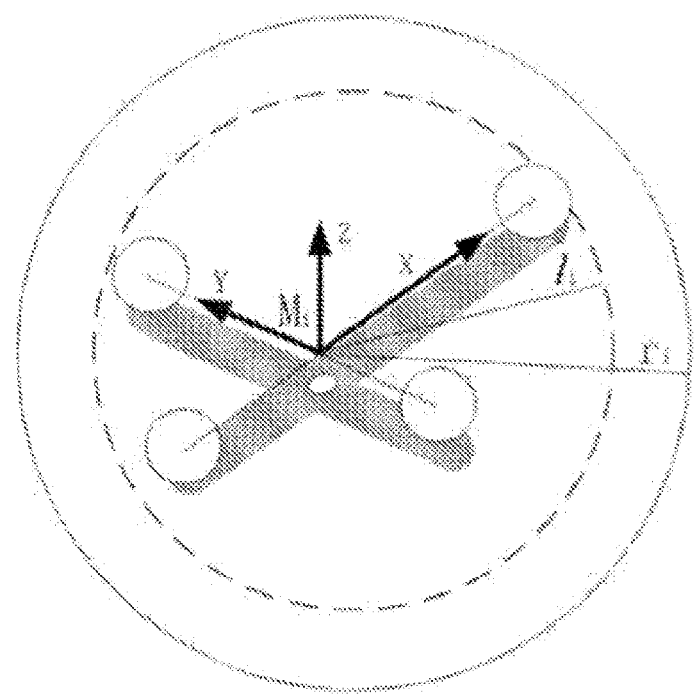
FIG. 4 is a diagram of establishing a positioning tool and its coordinate system according to an embodiment of the present disclosure.

FIG. 4 is a diagram of establishing a positioning tool and its coordinate system according to the present disclosure. The positioning tool is matched with the near-infrared optical positioning system (i.e. "positioning sensor"), as shown in FIG. 4. Each positioning tool has four balls with high reflectivity coating on the surface, which are distributed according to a certain positional relationship. The centers of four balls of the same positioning tool are on the same plane, and the normal direction of the plane where the centroid of K positioning parts is located is the z axis direction; and the direction towards the side where the K positioning parts are attached is the positive direction of the z axis. The position and/or number of balls of each positioning tool are different to distinguish the positioning tools. Each positioning tool uses the plane where the center of the ball is located. The intersection point with the central axis of the central hole of the connecting rod of the positioning tool (that is, an example of shape characteristics) is taken as the coordinate origin, and the direction of the intersection point pointing to the ball farthest from the origin is taken as the x axis direction. Taking the intersection point as the center of the circle, the minimum circumscribed ball enveloping all the balls is established, and the radius of the circumscribed ball is $l_i$. The set of all positioning tools is S. The center of the coordinate system of the i-th positioning tool is $M_i$, that is, $M_i \in S$.

Measurement viewing angle multi-objective optimization: information on and positions of all positioning tools of each link in a surgery process are obtained through the surgical operation planning system. The following multi-objective minimization problem is established:

$$\text{a decision variable: } x=[q_1, q_2, q_3, \ldots, q_7]$$

The decision variable denotes a vector consisted of seven joint variables of the robot, whose value range is the joint value range Q achievable by each joint of the robot, that is, $x \in Q$. Here, the number of joints of the robot can be any reasonable number.

The optimization objective is as follows (at least the objective functions $f_1$ and $f_2$ are simultaneously minimized). Optimization objective 1: the maximum distance between the positioning tool and the near-infrared optical positioning system is minimized;

$$f_1 = \max_m \|\overrightarrow{NM_m}\|$$

where $\max_m \|\overrightarrow{NM_m}\|$ denotes the distance between the coordinate origin of the m-th positioning tool and the coordinate origin of the near-infrared optical positioning system.
Optimization objective 2: $\min_{j,k \in S} O_{min}(j, k)$ denotes the minimum non-interference margin function value between the positioning tools. By taking the inverse number of its value, the value is transformed into a minimization optimization problem:

$$f_2 = \min_{j,k \in S} -O_{min}(j,k)$$

where $O_{min}(j, k)$ denotes the smaller non-interference margin function in the camera coordinates of the positioning sensor for a given pair of positioning tools j and k; $\min_{j, k \in S} O_{min}(j, k)$ denotes the minimum non-interference margin function value among the binary combinations of all the positioning tools measured in all the cameras of the positioning sensor under the pose of the robot determined by q; the non-interference margin function O(j, k, G) between the positioning tools j and k is defined as shown in FIG. 5.

Figure 5:
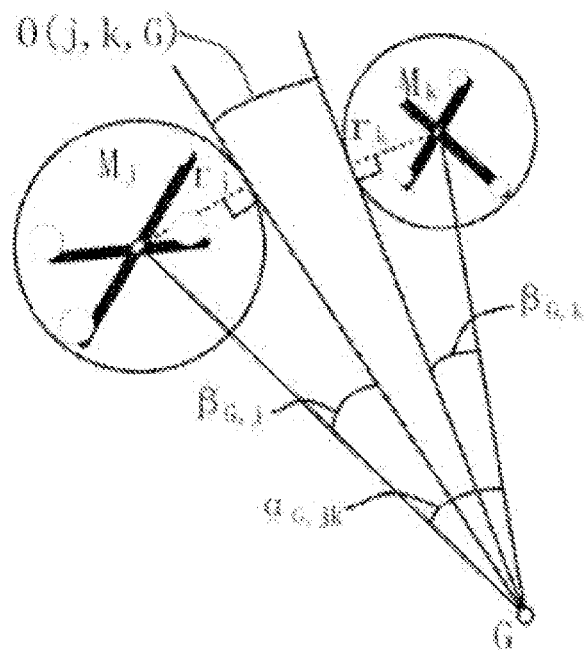
FIG. 5 is a schematic diagram of the design of the non-interference margin function O(j, k, G) according to an embodiment of the present disclosure.

FIG. 5 is a schematic diagram of the design of an non-interference margin function O(j, k, G) according to the present disclosure, which describes the definition of the non-interference margin function O(j, k, G). Specifically, FIG. 5 describes the geometric relationship between any two positioning tools and either of the left camera or the right camera of the positioning sensor. Therefore, if the number of the positioning tools is greater than 2, any two positioning tools and either of the left camera or the right camera will generate a specific value of O(j, k, G). For example, three positioning tools can generate six O(j, k, G) values, namely: O(1, 2, L), O(1, 3, L), O(2, 3, L), O(1, 2, R), O(1, 3, R), O(2, 3, R).

G is the coordinate origin of the left or right camera in the positioning sensor. $M_j$ and $M_k$ are the centers of any two positioning tools after the two positioning tools are abstracted into spheres, and are also the origin of the coordinate system of the positioning tools. $r_j$ and $r_k$ are the radii of the sphere into which the positioning tools are abstracted. Each positioning tool uses the intersection point between the plane where the center of the ball is located and the central axis of the central hole of the connecting rod of the positioning tool as the coordinate origin. The minimum circumscribed ball radius with the coordinate origin as the center is $l_i$. Considering the influence of errors in practical operation, the radius $r_i$ of the sphere into which the positioning tools are abstracted is obtained by expanding the margin ω times on the basis of $l_i$. (The feature of the positioning tool here is that four or more coplanar connecting rods extend from a center, and the ends of the connecting rods are provided with balls. In a set of navigation devices, the relative position between the balls of each positioning tool is unique). ω>1.

Therefore, the size of $r_j$ and $r_k$ are known. The length of the vectors $\|\overrightarrow{GM_j}\|$ and $\|\overrightarrow{GM_k}\|$ can be measured by the positioning sensors. $\beta_{G,j}$ and $\beta_{G,k}$ can be obtained by the following relationship:

$$\beta_{G,j} = \sin^{-1}\left(\frac{r_j}{\|\overrightarrow{GM_j}\|}\right)$$

$$\beta_{G,k} = \sin^{-1}\left(\frac{r_k}{\|\overrightarrow{GM_k}\|}\right)$$

$\alpha_{G,j,k}$ can be calculated by the vector:

$$\alpha_{G,j,k} = \cos^{-1}\left(\frac{\overrightarrow{GM_j} \cdot \overrightarrow{GM_k}}{\|\overrightarrow{GM_j}\|\|\overrightarrow{GM_k}\|}\right)$$

where · denotes the vector point multiplication.
Finally, $$O(j, k, G) = \min_{G=R,L}(\alpha_{G,j,k} - \beta_{G,j} - \beta_{G,k})$$

is calculated,
where $r_i = \omega l_i$, which denotes the radius of the sphere after the positioning tool is simplified;
where ω>1.
The constraint conditions are as follows:

constraint condition 1: $\forall i \in S, M_i \in A(x)$ constraint condition 2: $\forall i \in S, \max_{G \in \{R,L\}} \alpha_{G,i} \leq Th$ constraint condition 3: $\forall j, k \in S, \min_{G \in \{R,L\}} O(j, k, G) \geq 0$, where
constraint condition 1 indicates that any positioning tool should be in the observable range of both the positioning sensor and the environmental perception sensor;
constraint condition 2 indicates that the included angle between the connecting line from the camera on either side of the positioning sensor to any positioning tool and the z-axis direction of the positioning tool is not greater than the established threshold; $\alpha_{G,i}$ denotes the included angle between the vector from the coordinate origin of the i-th positioning tool to the coordinate origin of the left or right camera in the positioning sensor and the vector in the z-axis direction of the i-th positioning tool; and Th is a preset threshold, for example, Th=π/2;
constraint condition 3 indicates that any two positioning tools are not interfered from each other, that is, the minimum value of the non-interference margin function O(j, k, G) between any two positioning tools is non-negative.

Figure 6:
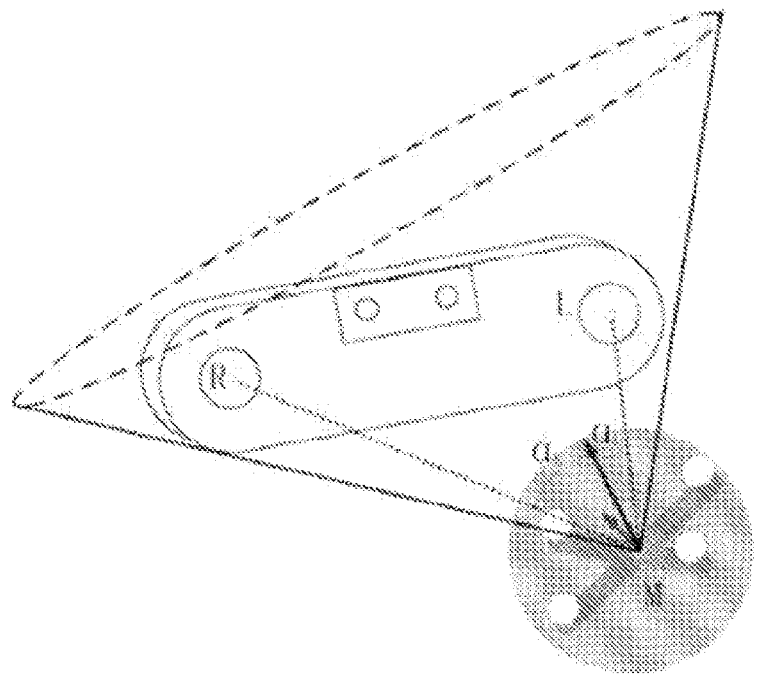
FIG. 6 is a schematic diagram of the observation angle $\alpha_{G,i}$ according to an embodiment of the present disclosure.

FIG. 6 is a schematic diagram of an observation angle $\alpha_{G,i}$ according to the present disclosure. The observation angle refers to the included angle between the origin of the left or right camera and the z axis of any of the positioning tools (the normal direction of the positioning tool pointing upward is fixed as the z axis of the coordinate of the positioning tool).

$$\alpha_{G,i} = \cos^{-1}\left(\frac{\overrightarrow{GM_1} \cdot \vec{Z}}{\|\overrightarrow{GM_1}\|\|\vec{Z}\|}\right)$$

As shown in FIG. 6, {G} is the origin of the coordinate system of the left or right camera of the positioning sensor. $\vec{Z}$ is the Z-axis unit vector of the positioning tool in {G}. $\vec{Z}$ and $\overrightarrow{GM_i}$ can be obtained by the positioning sensor so as to be placed into the formula for calculation. In addition, it should be noted that any camera on either side will have an observation angle value for any positioning tool.

To sum up, the following optimization problems need to be optimized:

The decision variable: $x=[q_1, q_2, q_3, \ldots, q_N]$

At the same time:

$$f_1 = \max_m \|\overrightarrow{NM_m}\|$$

$$f_2 = \min_{j,k \in S} -O_{min}(j,k)$$

is minimized.

At the same time, the following constraint conditions are considered:

$$\forall i \in S, M_i \in A(x) \quad \text{(i)}$$

$$\forall i \in S, \max_{G \in \{R,L\}} \alpha_{G,i} \leq Th \quad \text{(ii)}$$

$$\forall j, k \in S, \min_{G \in \{R,L\}} O(j, k, G) \geq 0 \quad \text{(iii)}$$

The above optimization problems can be solved by constraining the multi-objective optimization algorithm. In this example, the Pareto optimal solution of the above optimization problem can be obtained by using the MOEA/D-CDP algorithm.

Although the present disclosure has been particularly shown and described in conjunction with preferred embodiments, it should be understood by those skilled in the art that various changes in form and details can be made in the present disclosure without departing from the spirit and scope of the present disclosure as defined in the appended claims, which fall within the scope of protection of the present disclosure.

What is claimed is:

1. A measurement viewing angle multi-objective optimization method for a surgical robot navigation and positioning system, wherein the method obtains a number, a serial number and a position of required positioning tools of each link in a surgical process through a surgical operation planning system, and establishes a multi-objective minimization problem based on a decision variable x:

$$x=[q_1, q_2, q_3, \ldots, q_N] \quad \text{(Formula 1)}$$

where $q_1, q_2, q_3, \ldots, q_N$ are joint variables; N is the number of the joint variables; the decision variable x denotes a vector consisted of N joint variables of a robot, and the value range is the joint value range Q achievable by each joint of the robot, that is, $x \in Q$;

the method comprises the following steps:

Step 1, establishing a three-dimensional Cartesian coordinate system for each positioning tool;

Step 2, defining at least two objective functions $f_1$ and $f_2$ of minimization optimization;

Step 3, setting constraint conditions to minimize the at least two objective functions $f_1$ and $f_2$ at the same time;

wherein Step 1 comprises the following steps:

Step 1.1, designing a center of each positioning tool with a specific shape feature, and taking an intersection point between a feature axis and a plane where a centroid of a positioning part is located as a coordinate origin, wherein a shape feature is at least a round hole, a hemisphere, a boss and a cone; taking the coordinate origin as the center of a sphere, and constructing a minimum circumscribed ball enveloping K positioning parts on the positioning tool for each positioning tool, wherein the radius of the minimum circumscribed ball is $l_i$;

Step 1.2, taking a normal direction of the plane where the centroids of K positioning parts are located as a z axis direction, wherein the direction towards the side where the K positioning parts are attached is a positive direction of the z axis; establishing the three-dimensional Cartesian coordinate system by taking a direction perpendicular to the z axis and pointing to the positioning part farthest from the coordinate origin as the positive direction of the x axis;

Step 1.3, denoting a set of all positioning tools as S, in which the center of the coordinate system of the i-th positioning tool is $M_i$, that is, $M_i \in S$;

in which at least two objective functions $f_1$ and $f_2$ of minimization optimization in Step 2 are defined as follows:

$$f_1 = \max_m \|\overrightarrow{NM_m}\| \quad \text{(Formula 2)}$$

$$f_2 = \min_{j,k \in S} -O_{min}(j,k) \quad \text{(Formula 3)}$$

where $\|\overrightarrow{NM_m}\|$ denotes a distance between the coordinate origin of the m-th positioning tool and the coordinate origin of a positioning sensor; $f_1$ denotes a maximum distance between the coordinate origin of all positioning tools and the coordinate origin of the positioning sensor; $O_{min}(j, k)$ denotes a smaller non-interference margin function in a camera coordinates of the positioning sensor for a given pair of positioning tools j and k; $\min_{j,k \in S} O_{min}(j, k)$ denotes a minimum non-interference margin function value among the binary combinations of all the positioning tools measured in all the cameras of the positioning sensor under the pose of the robot determined by q;

calculating the smaller non-interference margin function $O_{min}(j, k)$ by the following formula:

$$\alpha_{G,j,k} = \cos^{-1}\left(\frac{\overrightarrow{GM_j} \cdot \overrightarrow{GM_k}}{\|\overrightarrow{GM_j}\|\|\overrightarrow{GM_k}\|}\right) \quad \text{(Formula 4)}$$

$$\beta_{G,j} = \sin^{-1}\left(\frac{r_j}{\|\overrightarrow{GM_j}\|}\right) \quad \text{(Formula 5)}$$

$$r_j = \omega l_j \text{ and } \omega > 1 \quad \text{(Formula 6)}$$

$$\beta_{G,k} = \sin^{-1}\left(\frac{r_k}{\|\overrightarrow{GM_k}\|}\right) \quad \text{(Formula 7)}$$

$$r_k = \omega l_k, \text{ and } \omega > 1 \quad \text{(Formula 8)}$$

$$O(j, k, G) = \min_{G=R,L}(\alpha_{G,j,k} - \beta_{G,j} - \beta_{G,k}) \quad \text{(Formula 9)}$$

$$O(j, k, L) = \min_L(\alpha_{L,j,k} - \beta_{L,j} - \beta_{L,k}) \quad \text{(Formula 10)}$$

$$O(j, k, R) = \min_R(\alpha_{R,j,k} - \beta_{R,j} - \beta_{R,k}) \quad \text{(Formula 11)}$$

$$O_{min}(j, k) = \min(O(j, k, L), O(j, k, R)) \quad \text{(formula 12)}$$

where G is the coordinate origin of the left or right camera in the positioning sensor; L and R are a coordinate origins of the left and right cameras in the positioning sensor, respectively; $M_j$ and $M_k$ are the centers of a minimum circumscribed ball whose radii are $l_j$ and $l_k$ for any two positioning tools j and k, respectively, that is, the coordinate origin of the positioning tools j and k; $r_j$ and $r_k$ are an extension radii of the positioning tools j and k, respectively; margin coefficient ω is a constant greater than 1; the vector lengths $\|\overrightarrow{GM_j}\|$ and $\|\overrightarrow{GM_k}\|$ are measured by the positioning sensor; · denotes vector point multiplication.

2. The measurement viewing angle multi-objective optimization method for the surgical robot navigation and positioning system according to claim 1, where the constraint conditions in Step 3 are as follows:

constraint condition 1: $\forall i \in S, M_i \in A(x)$ constraint condition 2: $\forall i \in S, \max_{G \in \{R,L\}} \alpha_{G,i} \leq Th$ constraint condition 3: $\forall j, k \in S, \min_{G \in \{R,L\}} O(j, k, G) \geq 0,$ where constraint condition 1 indicates that any positioning tool should be in an observable range of both the positioning sensor and an environmental perception sensor;

constraint condition 2 indicates that the included angle between the connecting line from the camera on either side of the positioning sensor to any positioning tool and the z-axis direction of the positioning tool is not greater than an established threshold; $\alpha_{G,i}$ denotes the included angle between the vector from the coordinate origin of the i-th positioning tool to the coordinate origin of the left or right camera in the positioning sensor and the vector in the z-axis direction of the i-th positioning tool; and Th is a preset threshold;

constraint condition 3 indicates that any two positioning tools are not interfered from each other, that is, the minimum value of the non-interference margin function O (j, k, G) between any two positioning tools is non-negative.

3. A surgical robot navigation and positioning system, which executes the measurement viewing angle multi-objective optimization method for the surgical robot navigation and positioning system according to claim 1, where the system comprises a surgical operation planning system, a control host for data processing and robot control, a serial robot having any degree of freedom, a positioning sensor and adaptive positioning tools, and an environmental perception sensor; the positioning sensor and/or the environment perception sensor are connected to an end flange of the robot;

the positioning sensor is an optical positioning sensor and comprises a binocular depth camera based on visible light and/or a binocular positioning camera based on near-infrared light;

the environment perception sensor comprises a binocular depth camera based on visible light, a laser radar and an ultrasonic sensor;

the environment perception sensor and the positioning sensor are two different types of sensors arranged in combination or are implemented by the same sensor which is used for environmental perception and positioning at the same time;

there is an overlapping area between spatial areas measured by the environmental perception sensor and the positioning sensor, and the overlapping area is a measurable area of the surgical robot navigation and positioning system;

there is one or more positioning tools; each positioning tool is provided with K positioning parts which are distributed and formed according to a certain positional relationship; according to the different positions and/or numbers of K positioning parts on each positioning tool, the positioning tool is uniquely determined; the positioning part is a specific marker capable of reflecting light or emitting light, and/or a part formed by arranging a plurality of specific patterns according to a certain positional relationship;

the specific marker capable of reflecting light at least comprises: balls with high reflectivity coating on the surfaces; the specific marker capable of emitting light at least comprises: an LED lamp;

the specific pattern is a pattern specially coded and designed, and at least comprises a QR Code and a Gray Code.

4. A surgical robot navigation and positioning system, which executes the measurement viewing angle multi-objective optimization method for the surgical robot navigation and positioning system according to claim 2, where the system comprises a surgical operation planning system, a control host for data processing and robot control, a serial robot having any degree of freedom, a positioning sensor and adaptive positioning tools, and an environmental perception sensor; the positioning sensor and/or the environment perception sensor are connected to an end flange of the robot;

the positioning sensor is an optical positioning sensor and comprises a binocular depth camera based on visible light and/or a binocular positioning camera based on near-infrared light;

the environment perception sensor comprises a binocular depth camera based on visible light, a laser radar and an ultrasonic sensor;

the environment perception sensor and the positioning sensor are two different types of sensors arranged in combination or are implemented by the same sensor which is used for environmental perception and positioning at the same time;

there is an overlapping area between spatial areas measured by the environmental perception sensor and the positioning sensor, and the overlapping area is a measurable area of the surgical robot navigation and positioning system;

there is one or more positioning tools; each positioning tool is provided with K positioning parts which are distributed and formed according to a certain positional relationship; according to the different positions and/or numbers of K positioning parts on each positioning tool, the positioning tool is uniquely determined; the positioning part is a specific marker capable of reflecting light or emitting light, and/or a part formed by arranging a plurality of specific patterns according to a certain positional relationship;

the specific marker capable of reflecting light at least comprises: balls with high reflectivity coating on the surfaces; the specific marker capable of emitting light at least comprises: an LED lamp;

the specific pattern is a pattern specially coded and designed, and at least comprises a QR Code and a Gray Code.

* * * * *